(12) United States Patent  
Easterday (10) Patent No.: US 6,476,339 B2
(45) Date of Patent: Nov. 5, 2002

(54) STUD WELDING GUN (75) Inventor: William Curtis Easterday, Elyria, OH (US)

(73) Assignee: Nelson Stud Welding, Elyria, OH (US)

( * ) Notice: Subject to any disclaimer, the term of this patent is extended or adjusted under 35 U.S.C. 154(b) by 32 days.

(21) Appl. No.: 09/740,137

(22) Filed: Dec. 18, 2000

(65) Prior Publication Data

US 2001/0022294 A1 Sep. 20, 2001

Related U.S. Application Data (63) Continuation-in-part of application No. 09/371,880, filed on Aug. 9, 1999, now Pat. No. 6,163,005.

(51) Int. Cl.$^7$ .............................................. B23K 9/20
(52) U.S. Cl. ................................... 219/99; 219/98
(58) Field of Search ........................... 219/98, 99

(56) References Cited

U.S. PATENT DOCUMENTS 3,303,318 A * 2/1967 Spisak ..................... 219/98
3,371,184 A * 2/1968 Napoli ..................... 219/98
5,824,987 A * 10/1998 Volk ........................ 219/98
6,163,005 A * 12/2000 Easterday ................. 219/99
6,239,401 B1 * 5/2001 McCardle et al. ........ 219/99

* cited by examiner

Primary Examiner—Clifford C. Shaw
(74) Attorney, Agent, or Firm—Howard & Howard (57) ABSTRACT A stud welding gun for alternatively welding studs of a first and second length to base members. The gun includes a stud feed member for moving a stud toward a stud holder. The gun further includes at least two stud cartridges each having a plurality of studs in side by side array and opposed end walls extending between first and second side walls. A first cartridge has end walls spaced a distance equal to studs having the first length. A second cartridge has end walls spaced a distance equal to studs having the second length. At least one of the side walls of each cartridge extends to a pre-determined overall length. A housing is adapted to receive the cartridges placing the studs in the path of the stud feed member. The gun includes a stud mover that sequentially moves the studs into the path of the stud feed member.

24 Claims, 5 Drawing Sheets

STUD WELDING GUN

RELATED APPLICATIONS

This is a Continuation In Part of U.S. patent application, Ser. No. 09/371,880 filed Aug. 9, 1999 now U.S. Pat. No. 6,163,005.

FIELD OF INVENTION

This invention relates to a stud welding gun for welding studs of different lengths to base members and a method of using the stud welding gun.

BACKGROUND OF THE INVENTION

The present invention relates to a new and improved stud welding gun which is used to weld studs to a base member.

Stud welding guns have previously been utilized to weld studs to a base member. The studs are welded to the base member by establishing an electrical arc between the stud and the base member to heat the metal at the tip of the stud and the base member to a molten or liquid state and then plunging the stud into the base member before the molten metal cools to solid state.

Stud welding guns have been utilized which incorporate a feed system to automatically feed the studs to the gun for quick sequential welding of studs. Stud welding guns have also been developed which can accommodate studs of varying lengths.

However, previous designs require that the gun be adapted in some way to accommodate the studs when switching from one length to another, as well as to accommodate the delivery system for the various lengths of studs. Typically the modifications necessary to allow the gun to switch from one length of stud to another are time consuming and involve interchanging various parts.

SUMMARY OF THE INVENTION AND ADVANTAGES

A stud welding gun for use in alternatively welding studs of a first length and a second length to base members. The stud welding gun comprises a handle assembly, and a frame which is connected with and extends outward from the handle assembly. The gun includes a stud holder disposed at an outer end portion of the frame to hold a stud while an electrical current flows between the stud and the base member during welding. The gun also includes a stud feed member and a housing that are connected with the frame. The stud feed member is movable from a retracted position to an extended position to move a stud toward the stud holder. The gun further includes at least two stud cartridges each having a plurality of studs. Each cartridge has opposed first and second side walls to receive a plurality of studs in side by side array and opposed end walls extending between the first and second side walls. A first cartridge has end walls spaced a distance approximately equal to the first length to receive studs having the first length. A second cartridge has end walls spaced a distance approximately equal to the second length to receive studs having the second length. At least one of the side walls of each of the cartridges extends beyond the end walls to a pre-determined overall length, each of the cartridges having said pre-determined overall length. The housing is adapted to receive cartridges of the pre-determined overall length, with a longitudinal central axis of each stud of the plurality of studs extending along the path of movement of the stud feed member between the extended and retracted positions. The gun includes a stud mover that sequentially moves studs in the plurality of studs into the path of movement of the stud feed member between the extended and retracted positions.

The stud welding gun of the present invention provides the advantage of including cartridges for delivering varying lengths of studs to the gun. The cartridges each have the same overall length, thereby making it possible to remove a first cartridge with studs of a first length from the gun and replace the first cartridge with a second cartridge of studs having a second length without having to make any modifications to the gun to accommodate the second cartridge. As used herein, the term "length" refers to the distance between opposing ends of the side walls of the cartridge. This feature and other features of the present invention provide a stud welding gun that can effectively be used to weld studs of different lengths while allowing the operator of the gun to change over from studs of a first length to studs of a second length quickly and easily.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3b is a side elevational view of the cartridge shown in FIG. 3a;

FIG. 4b is a side elevational view of the cartridge shown in FIG. 4a;

FIG. 5b is a side elevational view of the cartridge shown in FIG. 5a;

DETAILED DESCRIPTION OF THE PREFERRED EMBODIMENT

Figure 1:
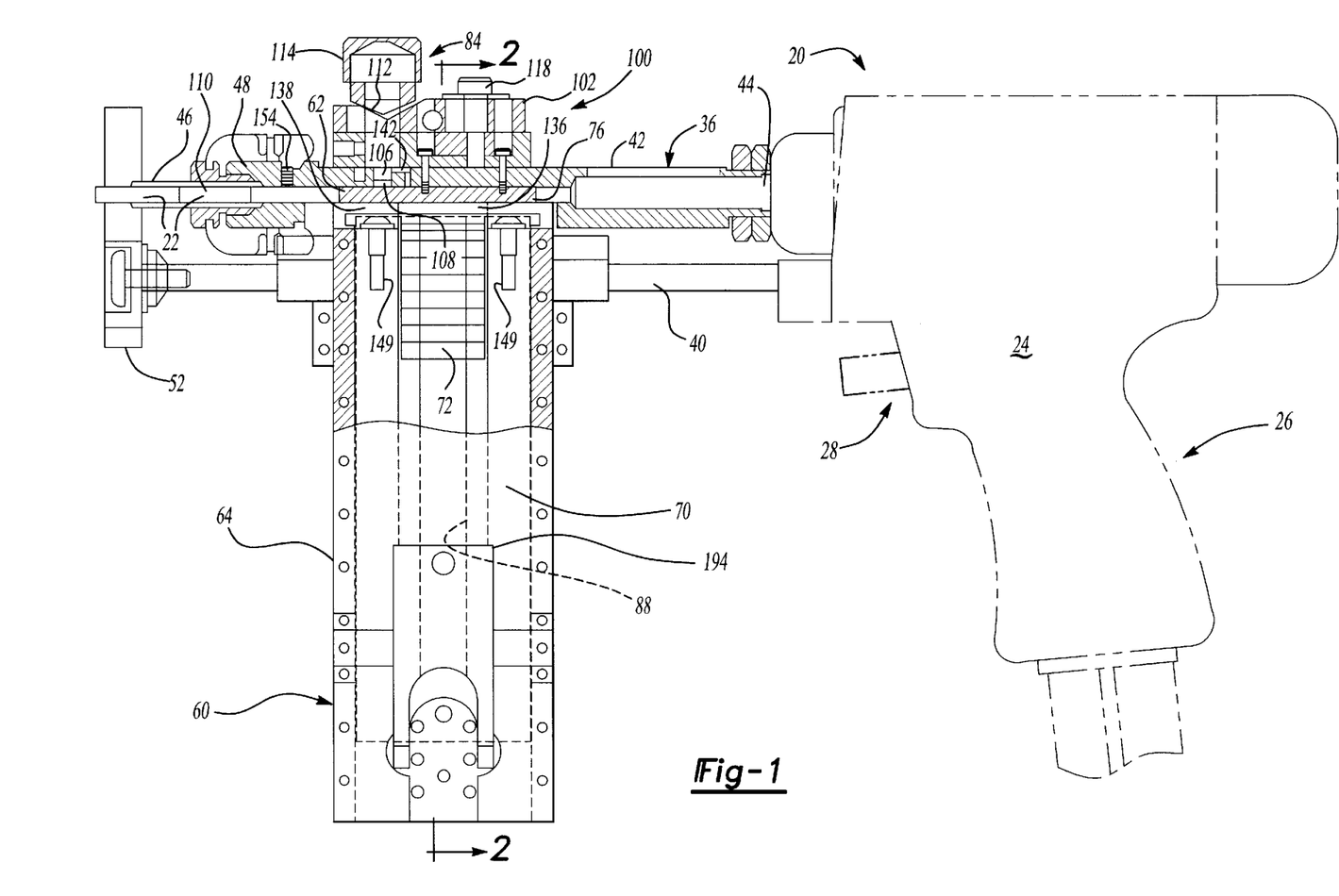
FIG. 1 is a partially broken away side elevational view of a stud welding gun of the present invention.

Referring to the Figures, wherein like numerals indicate like or corresponding parts throughout the several views, a stud welding gun of the present invention is shown generally at 20. Referring to FIG. 1, the stud welding gun 20 is utilized to sequentially weld studs 22 to a base member (not shown). The stud welding gun 20 includes a handle assembly 24 having a pistol grip 26 with a trigger switch 28. The trigger switch 28 is connected with a known controller by an electrical cable. Electrical current for establishing an arc between the stud 22 and the base member (not shown) is conducted to the pistol grip 26 through a second electrical cable. The general construction of the handle assembly 24 is the same as is disclosed in U.S. Pat. No. 3,809,849.

The stud welding gun 20 further includes a frame 36 which extends outward from the handle assembly 24. The frame 36 includes a pair of parallel solid cylindrical support rods 38, 40. The support rods 38, 40 are fixedly connected to the handle assembly 24. In addition, the frame 36 includes a tubular cylindrical barrel 42 which is movable along a longitudinal axis extending parallel to the longitudinal axes of the support rods 38, 40. A rear end portion 44 of the barrel 42 is connected to the handle assembly 24, and a front end portion 48 of the barrel 42 extends toward the front of the stud welding gun 20. A lifting mechanism, such as is disclosed in U.S. Pat. No. 3,809,849, is operable to move the barrel 42 along a longitudinal axis relative to the handle assembly 24.

A chuck 46 is connected to the front end portion 48 of the barrel 42 for holding each of the studs 22 in turn during welding of each stud 22 to a base member (not shown). At the front of the stud welding gun 20, a foot 52 is connected to the support rods 38, 40. The foot 52 includes a spark shield 54 that extends around a stud 22 that is being held by the chuck 46 during the welding operation.

The stud welding gun 20 includes a stud supply 60 that is operable to sequentially feed studs 22 to the stud welding gun 20. The barrel 42 includes a receiving location 62 and the stud supply 60 feeds studs 22 along a linear supply path to the receiving location 62. The stud supply 60 includes an elongated rectangular housing 64 which is fixedly connected to the support rods 38, 40 and extends downward from the support rods 38, 40.

The stud welding gun 20 includes a cartridge 70 for holding studs 22 disposed within the housing 64. The cartridge holds a plurality of studs 22 disposed in a linear array 72 with the studs in a side-by-side relationship. The longitudinal central axes of the studs 22 extend parallel to each other and parallel to a longitudinal central axis of the barrel 42 of the stud welding gun 20. By loading studs 22 to the cartridge 70, and loading the cartridge 70 to the housing 64, loading the stud welding gun 20 with studs 22 is facilitated.

The stud welding gun 20 also includes a stud feed member 76 which is movable along the barrel 42 from a retracted position to an extended position to move a stud 22 from the receiving location 62 toward the chuck 46. When the stud welding gun 20 is loaded with a stud 22, the stud feed member 76 is in the extended position whereby the stud feed member 76 extends into the receiving location 62. When the stud feed member 76 is moved toward the handle 24 from the extended position to the retracted position, the stud feed member 76 moves out of the receiving location 62 to enable the stud supply 60 to feed a next succeeding stud 22 into the receiving location 62. The stud feed member 76 is then returned forward toward the front of the stud welding gun 20, to the extended position to push a stud 22 from the receiving location 62 toward the chuck 46. As this occurs, a stud 22 is pushed into the chuck 46 to the welding position.

A manually engageable actuator member or handle 80 is connected with the stud feed member 76. The actuator member 80 is manually gripped by an operator of the stud welding gun 20 and pulled toward the handle assembly 24 to move the stud feed member 76 from the extended position to the retracted position. Similarly, the actuator member 80 is manually gripped by the operator and pushed toward the front of the stud welding gun 20 to move the stud feed member 76 from the retracted position back to the extended position. As the stud feed member 76 moves from the retracted position to the extended position, a stud 22 is pushed from the receiving location 62 toward the chuck 46.

A latch 84 is provided to hold the stud feed member 76 in the extended position during welding of a stud 22 held by the chuck 46 to a base member (not shown). The latch 84 is operable to a disengaged condition prior to movement of the stud feed member 76 from the extended position to the retracted position. During movement of the stud feed member 76 from the retracted position to the extended position, the latch 84 functions as a stop to block movement of the stud feed member 76 when it reaches the extended position.

Figure 6:
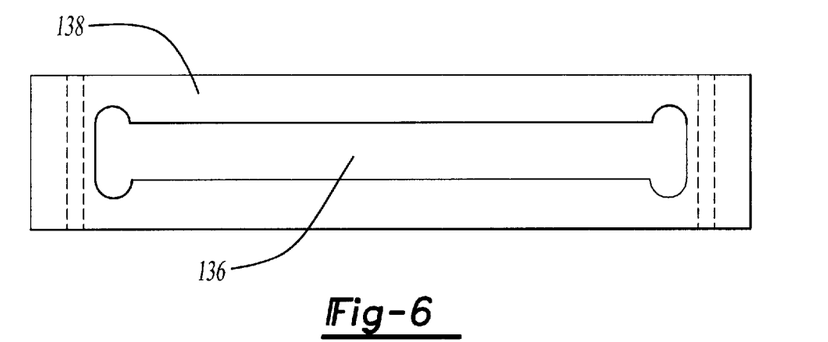
FIG. 6 is a top view of an aperture member of the present invention including an aperture for accommodating a stud having a first length.
Figure 7:
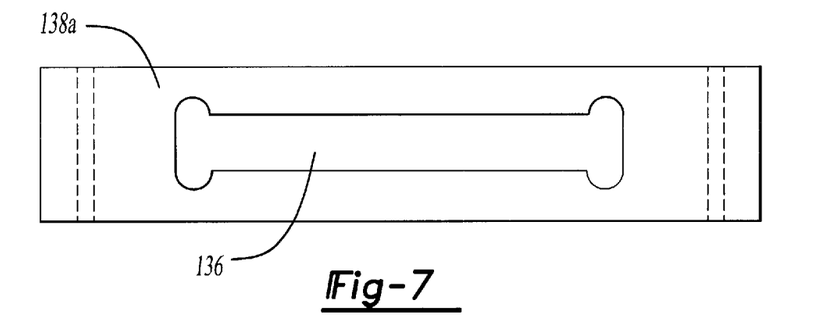
FIG. 7 is a top view of an aperture member of the present invention including an aperture for accommodating a stud having a second length.
Figure 8:
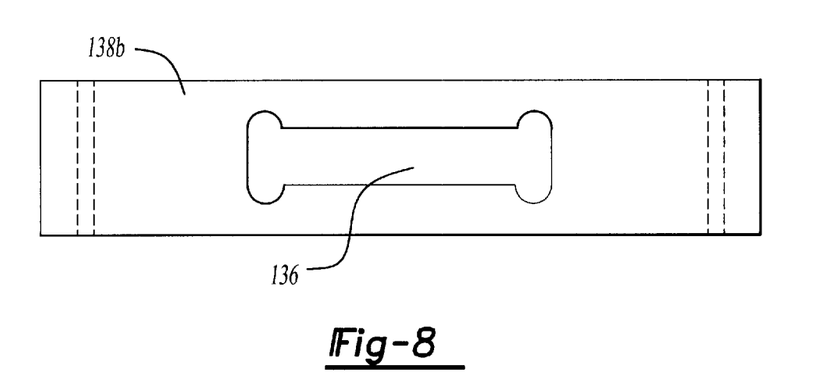
FIG. 8 is a top view of an aperture member of the present invention including an aperture for accommodating a stud having a third length.
Figure 9:
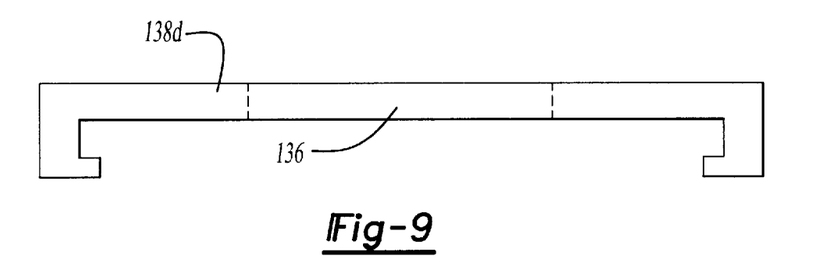
FIG. 9 is a side elevational view of the aperture member shown in FIG. 8.

The stud supply housing 64 includes an opening or slot 88 which can be varied to accommodate studs of different lengths. As was previously mentioned, the studs 22 are held in a linear array 72 in a cartridge 70. The stud welding gun 20 includes cartridges 70 that supply studs of different lengths to the stud welding gun 20. Referring to FIGS. 6 through 9, in order to allow the stud welding gun 20 to accommodate studs 22 of different length, the stud supply housing 64 includes an aperture member 138 disposed between the cartridge 70 and the receiving location 62. The aperture member 138 may be generally rectangular in shape, and includes a slot 136 extending through the aperture member 138. The slot 136 in the aperture member 138 is roughly the same width as the width of the studs 22 with a slight clearance, and roughly the same length as the studs 22 that are to be feed through the aperture member 138 with a slight clearance. When an operator wishes to change from one length of studs 22 to studs 22a of a different length the aperture member 138 can be removed, and a different aperture member 138 with a different length of slot 136 can be put in place. In the preferred embodiment, the slot 136 within the aperture member 138 is generally bone shaped, including end portions that are wider than the middle section of the slot 136. FIG. 6 shows an aperture member 138 with a slot 136 therein for transferring a stud 22 of a first length, FIG. 7 shows an aperture member 138 with a slot 136 therein for transferring a stud 22a of a second length, and FIG. 8 shows and aperture member 138 for studs 22b of a third length.

Figure 12:
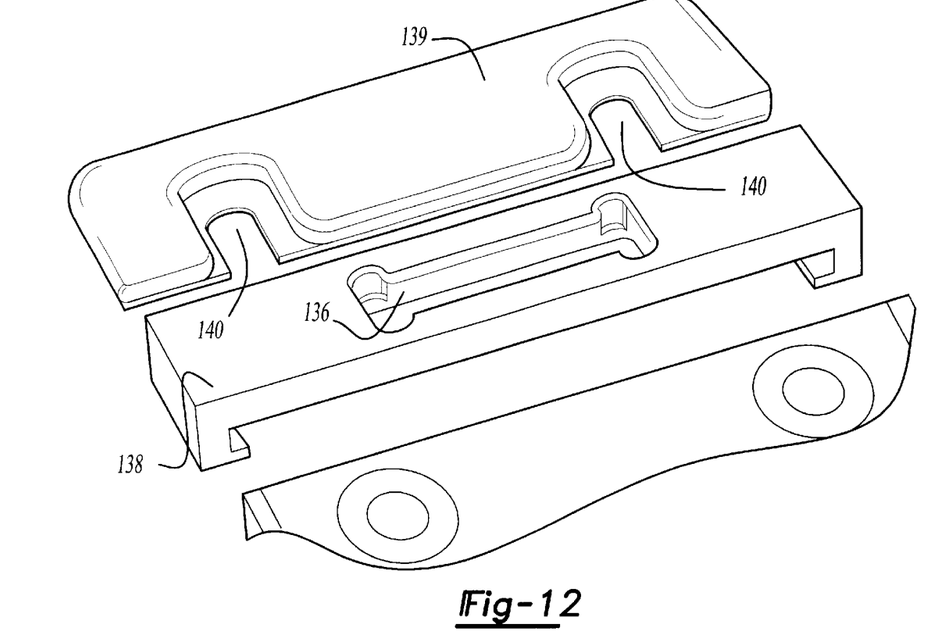
FIG. 12 is a perspective view of the aperture member retainer and aperture member of the present invention.
Figure 13:
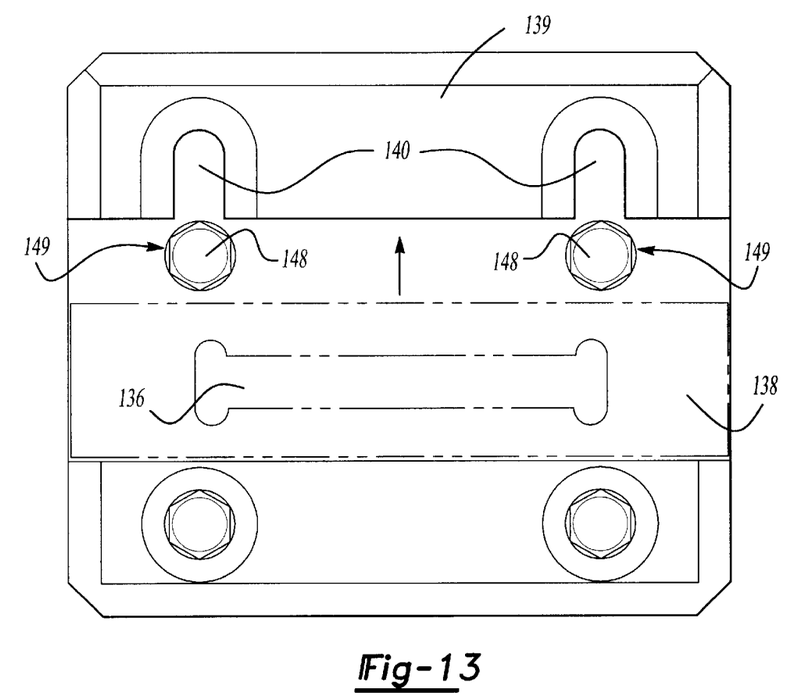
FIG. 13 is a top view of the aperture member retainer and aperture member where the aperture member retainer is shown in a removed position so the aperture member can be removed.

Referring to FIGS. 12 and 13, the aperture member 138 is held in place on the housing 64 by an aperture member retainer 139. The aperture member retainer 139 has a generally rectangular shape and is preferably made from nylon or another suitable material, and is removably secured to the housing 64. The aperture member retainer 139 includes a pair of slots 140 that receive a head portion 148 of a threaded fastener 149. The threaded fastener 149 threads into the housing 64, and when tightened, holds the aperture member retainer 139 securely in place. When the threaded fasteners 149 are loosened, the aperture member retainer 139 can be removed from the housing 64, or slid out of the way to allow the aperture member 139 to be removed.

In operation, when an operator wishes to change the length of studs 22 that are being welded, the threaded fasteners 149 are loosened and the aperture member retainer 139 is slid to the side, or removed completely from the housing 64. It is important to note, the threaded fasteners 149 do not necessarily need to be removed from the housing 64. The aperture member retainer can include open ended slots 140, such as shown in FIGS. 12 and 13, wherein the aperture member retainer 139 can be completely removed from the housing 64 by simply loosening the threaded fasteners 149. Alternatively, if the aperture member retainer 139 includes a pair of closed end slots (not shown) then the aperture member retainer 139 can still be slid out of the way to allow the removal of the aperture member 138 by simply loosening the threaded fasteners 149. After the aperture member 138 has been removed, a different aperture member 138a can be placed to the housing 64. After replacing the aperture member 138a, the aperture member retainer 139 is slid back into place such that the slots 140 are in engagement with the threaded fasteners 149. The aperture member retainer 139 is held firmly against the aperture member 138a until the threaded fasteners 149 are once again tightened, thereby holding the aperture member retainer 139 securely in place, and consequently holding the aperture member 138a securely in place.

It should be understood that although only three different length of studs 22, 22a, 22b are specifically accounted for with the three aperture members 138, 138a, 138b shown in FIGS. 6, 7 and 8, additional stud lengths may be provided for and the slot 136 within the aperture member 138 can be of any size suitable for any length of stud 22.

The studs 22, 22a, 22b have a generally cylindrical configuration that enables them to engage each other throughout the length of the studs 22, 22a, 22b and to be disposed in a side-by-side relationship in a linear array 72. If the studs 22, 22a, 22b were provided with a relatively large head end portion and a shank portion that extends from the head end portion, the studs 22, 22a, 22b could not be arranged in engagement with each other throughout their length and disposed in a side-by-side relationship in a linear array 72.

The studs 22, 22a, 22b are advantageously provided with opposite end portions which are mirror images of each other so that the studs 22, 22a, 22b can be fed to the chuck 46 with either end of the stud 22, 22a, 22b leading. The studs 22, 22a, 22b have opposite end portions with annular retaining rings. The retaining rings on one end portion of a stud 22, 22a, 22b are reversely arranged in comparison with the retaining rings on the opposite end of the stud 22, 22a, 22b. This results in the studs 22, 22a, 22b having opposite end portions that are mirror images of each other. Although the studs 22, 22a, 22b could have many different constructions, it is contemplated that it may be preferred to construct the studs 22 in the same manner as is disclosed in U.S. patent application Ser. No. 09/271,661 filed Mar. 17, 1999 by Clark B. Champney and William C. Easterday and entitled "Stud Having Annular Rings".

Movement of Stud Along Barrel to Chuck

The stud feeder member 76 reciprocates along a cylindrical passage 74 in the barrel 42 to sequentially feed studs 22 from the receiving location 62 to the chuck 46. A carriage 100 is fixedly connected with the stud feed member 76. The actuator member 80 is fixedly connected to a slide member 102. The slide member 102 is mounted on the carriage 100 and is movable through limited distances toward either the front of the stud welding gun 20 or toward the handle assembly 24 relative to the carriage 100. The latch 84 is connected with the carriage 100 and moves with the carriage and stud feed member 76 relative to barrel 42.

The latch 84 has a cylindrical end portion 106 that engages a cylindrical opening 108 in the barrel 42. When the latch 84 is in the engaged position, the latch engages the opening 108 to hold the carriage 100 against movement relative to the barrel 42. By blocking movement of the carriage 100 relative to the barrel 42, the latch 84 prevents movement of the stud feed member 76 during welding of a stud 22 held by the chuck 46 to a base member (not shown).

During welding of a stud 22 held by the chuck 46, force is transmitted axially through a linear array 110 of studs 22 disposed in the barrel 42. The linear array 72 of studs 22 extends from the chuck 46 through a chuck nut 112 to the stud feed member 76. At this time, the stud feed member 76 extends through the receiving location 62 to block the feeding of a stud 22 from the stud supply housing 64 into the barrel 42.

Upon completion of welding of the leading stud 22 to the base member (not shown), the stud welding gun 20 is moved away from the base member to pull the stud welding gun 20 off of the stud 22 which is welded to the base member. Once the stud welding gun 20 has been disengaged from the stud 22 which has been welded to the base member, the chuck 46 is empty and the array 110 of studs 22 in the barrel 42 can be advanced to position a next succeeding stud 22 in the chuck.

In order to enable a stud 22 to be moved into the stud receiving location 62, the stud feed member 76 must be moved out of the receiving location. To accomplish this, an operator grips the actuator member 80 and pulls the actuator member toward the handle assembly 24. As the actuator member 80 is moved, the slide member 102 is also moved toward the handle assembly 24 relative to the carriage 100. Movement of the slide member 102 toward the handle assembly 24 relative to the carriage 100 causes a cam surface 112 on the slide member to force a head end portion 114 of the latch 84 upward away from the stud feed member 76. A shoulder screw 118 is fixedly connected with the carriage 100 and guides movement of the slide member 102 relative to the carriage. As the latch 84 is moved upward by the cam surface 112, a spring (not shown) is compressed and the end portion 106 of the latch 84 moves out of the opening 108 in the barrel 42.

When the end portion 106 of the latch 84 has moved out of the opening 108 in the barrel 42, the stud feed member 76 and carriage 100 are released for movement relative to the barrel. Therefore, the continued application of manual force to the actuator 80 is effective to pull the stud feed member 76, carriage 100 and slide member 102 together toward the handle assembly 24. As this occurs, an end portion 124 on the stud feed member 76 moves away from the studs 22 disposed immediately ahead of the chuck 46.

Continued manual application of the pulling force to the actuator member 80 by the operator of the stud welding gun 20 moves a spacer member 128 connected with the bottom of the carriage 100 along a linear rectangular slot 130 formed in the barrel 42. The stud feed member 76 is suspended from the carriage 100 with the spacer member 128 between the stud feed member 76 and the carriage 100.

When the stud feed member 76 has moved to the retracted position, the end portion 106 of latch 84 abuts a stop surface 132 formed in the guide slot in the barrel 42 to block further movement of the carriage 100 and stud feed member 76 toward the handle assembly 24.

When the stud feed member 76 has moved to the retracted position, a stud 22 disposed at the upper end of the linear array 72 in the slot within the rectangular aperture member is released for upward movement into the receiving location 62 in the barrel 42. When the stud 22 is in the receiving location 62 in the barrel 42, a longitudinal central axis of the stud 22 is aligned with a longitudinal central axis of the stud feed member 76.

After the stud feed member 76 has been moved to the retracted position, the operator reverses the force applied against the actuator member 80. Thus, rather than pulling the actuator member 80 toward the handle assembly 24, the operator manually pushes against the actuator member 80. This pushing movement urges the actuator member 80 toward the front of the stud welding gun 20.

Initial movement of the actuator member 80 toward the front of the stud welding gun 20 results in movement of the slide member 102 toward the front of the stud welding gun 20 relative to the carriage 100. The end portion 106 on the latch 84 slides along a shoulder 142 of the slot 130 to maintain the latch 84 in the disengaged condition. The shoulder 142 on the slot 130 holds the latch 84 in a disengaged position during movement of the slide member 102, carriage 100 and stud feed member 76.

As the stud feed member 76 moves toward the front of the stud welding gun 20 from the retracted position, the end portion 124 of the stud feed member 76 moves into engagement with an end of a stud 22 disposed at the receiving location 62. Continued movement of the actuator member 80 and stud feed member 76 pushes the stud 22 from the receiving location into engagement with a preceding stud disposed in the barrel 42 ahead of the chuck 46. Continued movement of the stud feed member 76 moves the next stud to be welded into the chuck 46 and moves the stud 22 engaged by the end portion 124 of the stud feed member 76 out of the receiving location and into a line of studs 22 waiting to move into the chuck 46.

As this occurs, the end portion 106 of the latch 84 moves into abutting engagement with a portion 144 of the opening 108 in the barrel 42. This results in movement toward the front of the stud welding gun 20 of the stud feed member 76 being interrupted with the stud feed member 76 in the extended position.

The operator then interrupts the application of manual force to the actuator member 80. At this time, the end portion 106 of the latch is no longer held in the disengaged condition by the shoulder 142 on the slot 130. Force transmitted from the compressed spring 122 is transmitted from the latch body 145 to a cylindrical section 146 that is fixedly connected with the end portion 106. This force moves the end portion 106 downward into the opening 108 in the barrel 42 under the influence of the biasing spring 122.

When the stud feed member 76 has moved back to the extended position, the leading stud 22 in the axially aligned array of studs in the barrel 42 is gripped by the chuck 46 and is in position for welding to a base member. The stud 22 gripped by the chuck 46 is blocked against movement toward the handle assembly 24 by the studs 22 disposed in the barrel 42 between the feed member 76 and the chuck 46.

It is contemplated that the stud welding gun 20 may be utilized to weld studs 22 to base members which are disposed above an operator, for example, to a ceiling or to an overhead beam. When the stud welding gun 20 is used to effect an overhead stud welding operation, the barrel 42 of the stud welding gun 20 may be pointed upward when the operator pulls the actuator member 80 to move the stud feed member 76 from the extended position toward the retracted position. At this time, a detent assembly 154 in the barrel 42 prevents downward movement of a stud 22 immediately ahead of the receiving location 62 under the influence of gravity.

The detent assembly 154 includes a plurality of spring biased plungers (not shown). The spring biased plungers grip the stud 22 disposed immediately ahead of the receiving location 62 to hold the stud 22 against downward movement under the influence of gravity. Although the detent assembly 154 grips the stud 22 disposed immediately ahead of the receiving location 62 in the barrel 42, the detent assembly 154 does not provide sufficient force to prevent studs 22 from being fed through the detent assembly 154 during movement of the stud feed member 76 from the retracted position to the extended position.

The stud supply 60 is effective to move a stud 22 to the receiving location 62 when the stud feed member 76 moves to the retracted position. The stud supply 60 holds the linear array 72 of studs 22 with a longitudinal central axis of the linear array extending perpendicular to the path of movement of the stud feed member 76 relative to the barrel 42. Each time the stud feed member 76 is moved from the extended position to the retracted position, a single stud 22 is moved upward from the slot in the aperture member 138 to the receiving location 62 in the barrel 42. As this occurs, a spring biased pusher member 164 urges the linear array 72 of studs 22 upward to move a next succeeding stud 22 to the slot 136 in the aperture member 138.

The pusher member 164 is continuously urged upward toward the barrel 42 of the stud welding gun 20 by a spring 168. The spring 168 includes a band 170 that is connected to the pusher member 164. The spring 168 is a spiral coil spring which is coiled about an axis which extends parallel to the central axis of the barrel 42 and is disposed adjacent to the receiving location 62. The spring 168 continuously tensions the band 170 with a substantially constant force to pull the pusher member 164 upward.

The upward force applied to the pusher member 164 by the spring 168 is transmitted from the pusher member to a lowermost stud 22 in the linear array 72. Since the studs 22 in the linear array 72 are disposed in engagement with each other, the force is transmitted through the linear array 72 to a stud 22 disposed in the slot 136 in the aperture member 138. This force urges the studs 22 toward the receiving location 62. Therefore, whenever the stud feed member 76 is moved from the extended position to the retracted position, the stud 22 disposed in the slot 136 in the aperture member 138 moves to the receiving location 62 and a next succeeding stud 22 moves into the slot 136 in the aperture member 138.

Figures 2, 10, 11:
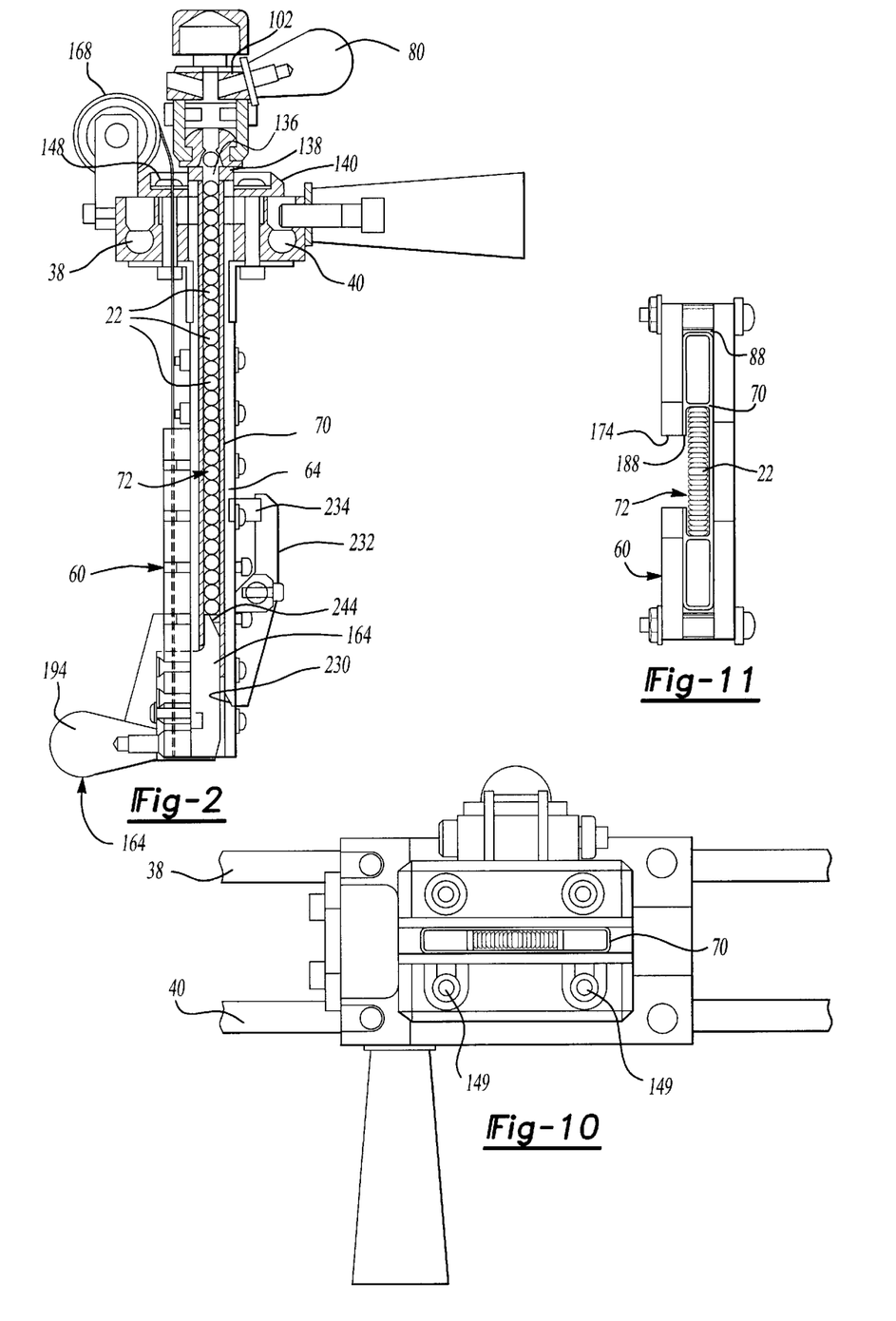
FIG. 2 is a sectional view, taken generally along the line 2—2 of FIG. 1.
FIG. 10 is a top view of the stud welding gun of FIG. 1 with the aperture member and the assembly above the aperture member removed to illustrate the assembly before receipt of the aperture member.
FIG. 11 is a bottom view of the stud welding gun of FIGS. 1 and 2 showing only the magazine assembly.

As the studs 22 are sequentially welded onto a base member (not shown) by operation of the stud welding gun 20, the pusher member 164 is moved upwardly along a slot 174 in the housing 64. The slot 174 is formed by a pair of parallel rectangular side walls 178, 180 of the housing 64. The pusher member 164 has a foot portion 184 that is wider than the slot 174 and is movable into a cartridge 70 to engage the linear array 72 of studs.

The cartridge 70 has a linear opening 188 in a first side wall 212 of substantially the same size as the slot 174 in the housing 64. The opening 188 in the cartridge 70 is aligned with the slot 174 in the housing 64. Therefore, the foot portion 84 of the pusher member 164 can move upward along both the slot in the housing 174 and the opening 188 in the cartridge 70 to push the entire array 72 of studs upward toward the barrel 42 of the stud welding gun 20. When the entire array 72 of studs 22 in the cartridge 70 have been welded, the cartridge 70 will be empty. In addition, the last stud 22 in the array 72 of studs will have been fed from the receiving location 62 by the stud feed member 76. When the stud feed member 76 is moved back to the retracted position, a leading end portion 190 of the pusher member 164 enters the receiving location 62. Therefore, at this time, the pusher member 164 will block movement of the stud feed member 76 from the retracted position to the extended position. This provides a clear tactile indication to the operator of the stud welding gun 20 that there are no studs 22 in the stud supply 60.

After all of the studs 22 in a linear array 72 of studs have been fed from the stud supply 60 to the receiving location 62, the pusher member 164 is manually pulled downward away from the barrel 42 toward the lower end portion of the housing 64. The pusher member 164 is then moved to a holding position offset to one side of the opening 88 in the housing 64 to enable the empty cartridge 70 to be removed from the housing 64 and a full cartridge 70 to be inserted into the housing 64.

To move the pusher member 164 to the holding position, the operator manually grasps a handle 194 connected with the pusher member 164 and pulls the pusher member toward the front of the stud welding gun 20. As this occurs, retaining flanges 198, 200 on the pusher member 164 move into a slot that is offset toward the front of the stud welding gun 20 relative to the side walls 178, 180 of the housing 64. At this time, the pusher member 164 is held in a position offset to one side of the opening 88 in which the cartridge 70 is received. This enables the empty cartridge 70 to be removed from the housing 64 and a next succeeding cartridge, containing an array 72 of studs, to be loaded into the housing. By providing a holding or parking location for the pusher member 164 offset to one side of the opening 88, the pusher member 164 remains connected with the housing 64 during the unloading of an empty cartridge 70 from the housing 64 and the subsequent loading of a full cartridge 70 into the housing 64.

Cartridge

The cartridge 70 holds a linear array 72 of studs 22. The cartridge 70 is integrally formed preferably from polymeric material and includes first and second side walls 212, 210 that may be flat and rectangular. The first and second side walls 212, 210 are preferably parallel to each other, and spaced apart from each other by a distance which is equal to the diameter of a stud 22 to be held in the cartridge 70 along with a small amount of clearance.

The cartridge further includes a pair of end walls 216 extending between the first and second side walls 210, 212. The end walls 216 are parallel to each other and extend perpendicularly to the first and second side walls 210, 212. The end walls 216 are spaced a distance from each other that is approximately the same distance as the length of the studs 22 which are to be retained in the cartridge 70.

One of either the first or second side walls 210, 212 extends outward beyond the endwalls 216 to a pre-determined length. The pre-determined length is approximately the same size at the space within the housing 64 in which the cartridge 70 is held. This pre-determined distance is the same for any cartridge 70 so that any cartridge 70, holding any size stud 22, will fit within the stud supply housing 64. By including the extra length of side wall 210, 212 extending outward beyond the end walls 216, there is no need to include a spacer strip or other device to fill the gaps when cartridges 70 made for different lengths of studs 22 are used. The distance between the end walls 216 is different, based upon the length of the studs 22 to be held therein, and the overall length of any cartridge 70 is the same, as determined by the size of the opening in the housing 64.

In the preferred embodiment, both side walls 210, 212 of the cartridge 70 extend out to the pre-determined length, and the cartridge 70 includes a pair of outer walls 218 extending between the distal ends of the side walls 210, 212. The outer walls 218 are parallel to each other and extend perpendicularly to the first and second side walls 210, 212. Thus, in this embodiment, the "length" of each cartridge is the distance between the outer walls 218. However, it is to be understood that either one or both of the end walls 216 may serve as the outer wall or walls 218.

Figure 3A:
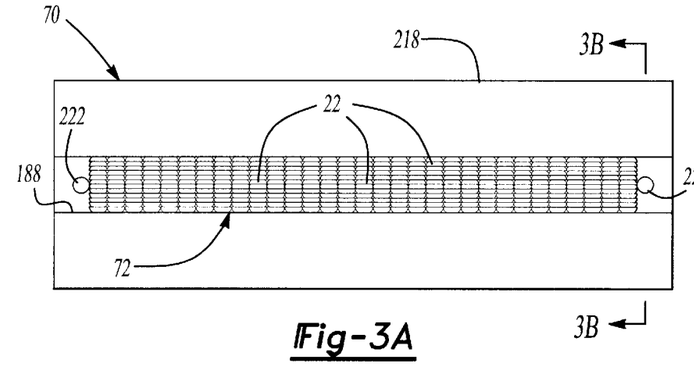
FIG. 3a is a front elevational view of a cartridge for the stud welding gun of the present invention with endwalls spaced to accommodate studs of a first length.
Figure 3B:
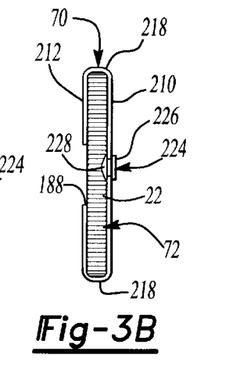
Figure 4A:
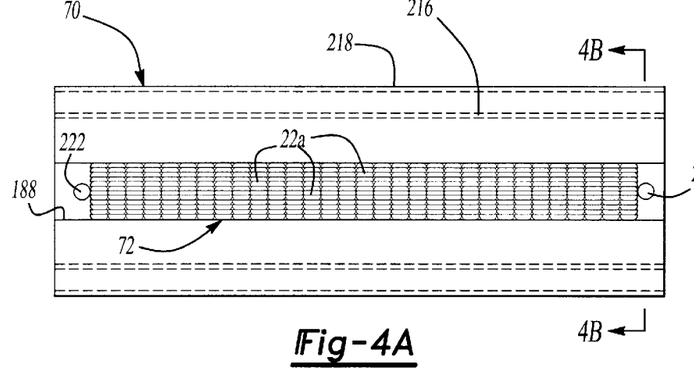
FIG. 4a is a front elevational view of a cartridge for the stud welding gun of the present invention with endwalls spaced to accommodate studs of a second length.
Figure 4B:
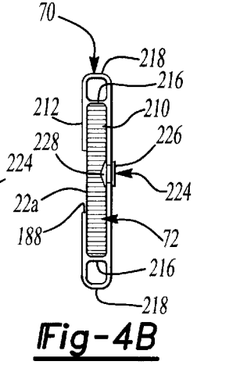
Figure 5A:
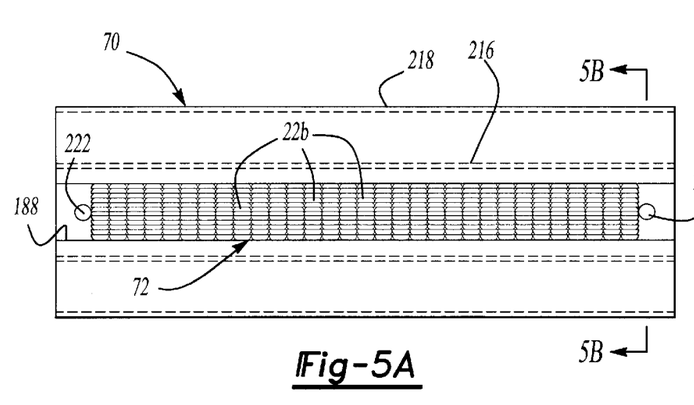
FIG. 5a is a front elevational view of a cartridge for the stud welding gun of the present invention with endwalls spaced to accommodate studs of a third length.
Figure 5B:
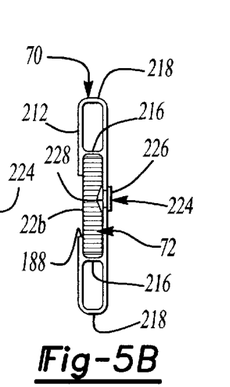

The linear array 72 of studs 22 is held in the cartridge 70 by a pair of detents 222 and 224. The studs 22 in the linear array 72 are disposed in a side-by-side relationship and have central axes which extend perpendicular to a central axis of the cartridge 70. The linear array 72 has a central axis which is coincident with the central axis of the cartridge 70.

The detents 222 and 224 extend through circular openings in the second side wall 210. The detent 222 engages the uppermost stud 22 in the cartridge 70 while the detent 224 engages the lowermost stud 22 in the cartridge 70. The detents 222 and 224 have the same construction, including a circular head end portion 226 which engages an outer side surface of the second side wall 210. The detents 222 and 224 also have shank portions 228 that extend through circular openings in the second side wall 210.

Immediately prior to insertion of the stud retainer 70 into the housing 64 of the stud supply 60, the upper detent 222 is manually pushed out of the opening in the second side wall 210 of the cartridge 70. This releases the array 72 of studs for movement through the upper end portion of the cartridge 70. The lower detent 224 remains in place to prevent the linear array 72 of studs from moving out of the cartridge 70 under the influence of gravity.

The cartridge 70 is then inserted into the lower end of the housing 64 while the pusher member 164 is offset toward one side of the opening or slot 88 in the housing 64. As the cartridge 70 is moved into the housing 64, the leading end portion 190 of the cartridge engages a cam surface 230 on a latch member 232. Engagement of the leading end portion 190 of the cartridge 70 with the cam surface 230 and latch member 232 pivots the latch member 232 in a counterclockwise direction against the influence of a biasing spring 234. The pivotal movement of the latch member 232 moves a nose or latching end portion 240 of the latch member 232 to a disengaged position, offset from the path of movement of the cartridge 70, into the housing 64.

The cartridge 70 with the linear array 72 of studs therein is then moved further into the opening or slot 88. When the lower end portion of the cartridge 70 moves past the nose or latching end portion 240 on the latch member 232, the spring 234 is effective to move the latch member 232 back to the engaged position. The pusher member 164 is then moved back into the slot or opening 188. The spring 168 pulls the pusher member 168 upward into the lower end portion of the slot 188 in the cartridge 70.

A cam surface 244 on the pusher member 164 engages the detent 224 at the lower end of the linear array 72 of studs 22. The force applied by the cam surface 244 against the detent 224 is effective to force the detent 224 out of the opening in the second side wall 210 of the cartridge 70. The leading end portion 190 of the pusher member 164 then moves into engagement with the lowermost stud 22 in the linear array 72 of studs.

The force transmitted from the spring 168 through the pusher member 164 to the linear array 72 of studs 22 moves the linear array 72 of studs upward along the opening 88 in the housing 64. This moves the uppermost stud 22 in the cartridge 70 into the slot 136 within the aperture plate 138. When the actuator member 80 is again manually pulled by the operator of the stud welding gun 20, the stud feed member 76 is pulled toward the handle assembly to enable the pusher member 164 to move the uppermost stud 22 in the linear array 72 of studs upward from the slot 136 within the aperture plate 138 into the receiving location 62.

When the actuator member 80 is pushed forward toward the front of the stud welding gun 20, the stud feed member 76 is effective to push the stud 22 from the receiving location 62 toward the chuck 46. The next stud 22 to be welded is moved into the chuck 46 as the stud feed member 76 is moved back to the extended position.

When all of the studs 22 have been removed from the cartridge 70, the empty cartridge 70 is removed from the stud welding gun 20. To remove an empty cartridge 70 from the stud welding gun 20, the pusher member 164 is pulled downward and moved to the holding position offset to one side of the opening 88. The latch member 232 is then manually depressed against the influence of the spring 234. The resulting counterclockwise rotation of the latch member 232 moves the latching end portion 240 of the latch member 232 out of engagement with the lower end of the empty cartridge 70. The empty cartridge 70 then moves out of the opening or slot 88 under the influence of gravity.

Since each cartridge 70 includes side walls 210, 212 that extend out to a common pre-determined distance, all the cartridges 70 are the same overall length. The cartridges 70 are adapted for different lengths of studs 22 by spacing the end walls 216 to the appropriate distance. The longest stud 22 that can be accommodated by the system is a stud 22 that is approximately as long as the pre-determined distance. In this situation, the end walls 216 and the outer walls 218 are the same structure. This feature allows the operator to change from a cartridge 70 holding studs 22 of a first length to a cartridge 70 holding studs 22 of a second length in the same way as is done when changing to a cartridge 70 of studs 22 having the same length. No further modifications are made to the housing 64 in order to accommodate cartridges 70 having studs 20 of any size.

SUMMARY

An improved stud welding gun 20 is used to weld studs 22 to a base member. The stud welding gun 20 includes a frame 36 which extends outward from the handle assembly 24. A chuck 46 is disposed at an outer end portion of the frame 36 and holds a stud 22 during welding of the stud to the base member.

A stud supply 60 is connected with the frame. The stud supply 60 is operable to sequentially feed studs along a linear supply path to a receiving location 62 disposed between the handle assembly 24 and the chuck 46. A stud feed member 76 is connected with the frame 36 and is movable from a retracted position to an extended position to move a stud from the receiving location 62 toward the chuck 46. A manually engageable actuator member 80 is connected with the stud feed member 76 to move the stud feed member between the extended and retracted positions under the influence of force manually applied to the actuator member.

A latch 84 retains the stud feed member 76 in the extended position during welding of a stud 22 to a base member. The latch 84 is movable relative to the stud feed member 76 between an engaged condition and a disengaged condition.

The stud supply 60 includes a housing 64 that is connected with the frame 36. A cartridge 70 holds a plurality of studs 22. The cartridge 70 is disposed in an opening 88 in the housing 64 with a longitudinal central axis of each of the studs 22 extending along the path of movement of the stud feed member 76 between the extended and retracted positions. The housing can accommodate cartridges holding studs of varying lengths and does not require modification to switch from studs of one length to studs of another length. A stud mover or pusher member 164 sequentially moves studs 22 into the path of movement of the stud feed member 76.

Cartridges 70 are provided to hold studs 22 of different lengths. A slot 136 within an aperture plate 138 mounted to the housing 64 can be changed to provide the appropriate size slot 136 to transfer studs 22 from the stud supply 60 to the receiving location 62.

From the above description of the invention, those skilled in the art will perceive improvements, changes and modifications. Such improvements, changes and modifications within the skill of the art are intended to be covered by the appended claims.

What is claimed is:

1. A stud welding gun for use in welding studs of a first length and a second length to base members, said stud welding gun comprising:

a handle assembly;

a frame which is connected with and extends outward from said handle assembly;

a stud holder disposed at an outer end portion of said frame, said stud holder being effective to hold a stud while an electrical current flows between the stud held by said stud holder and the base member during welding of the stud held by said stud welding gun to the base member;

a stud feed member which is connected with said frame and is movable from a retracted position to an extended position to move a stud toward said stud holder;

a housing connected with said frame;

at least two stud cartridges each having a plurality of studs, each cartridge having opposed first and second side walls to receive a plurality of studs in side by side array and opposed end walls extending between said first and second side walls, including a first cartridge having end walls spaced a distance approximately equal to said first length to receive studs having said first length and a second cartridge having end walls spaced a distance approximately equal to said second length to receive studs having said second length, at least one of said side walls of each of said cartridges extending beyond said end walls to a pre-determined overall length, each of said cartridges having said pre-determined overall length, and said housing adapted to receive cartridges of said pre-determined overall length, with a longitudinal central axis of each stud of the plurality of studs extending along the path of movement of said stud feed member between the extended and retracted positions; and a stud mover which sequentially moves studs in the plurality of studs into the path of movement of said stud feed member between the extended and retracted positions.

2. The stud welding gun as described in claim 1, wherein said first and second side walls each extend beyond said end walls to said pre-determined overall length.

3. The stud welding gun as described in claim 2, wherein said cartridges include outer walls extending between opposed distal ends of said side walls.

4. The stud welding gun as described in claim 1, wherein said end walls of said first cartridge are said outer walls of said first cartridge.

5. The stud welding gun as described in claim 1, wherein said stud welding gun includes a first passage generally coaxially aligned with said stud holder, and a second passage extending generally transverse to said first passage and communicating with said first passage for transmitting studs from said cartridge to said stud holder, wherein said second passage comprises one of at least two aperture members mounted to said housing, including a first aperture member having a generally rectangular shape and a slot formed therein, said slot having a length approximately equal to said first length, a second aperture member having a generally rectangular shape with dimensions substantially the same as said first aperture member and a slot formed therein, said slot in said second aperture member having a length approximately equal to said second length.

6. The stud welding gun as described in claim 5, including a slidable aperture member retainer for removably securing said aperture member to said housing wherein said aperture member retainer is generally rectangular in shape and includes a pair of slots extending perpendicular to said slot in said aperture member for slidably securing said aperture member retainer to said housing.

7. The stud welding gun as described in claim 6, including a pair of threaded fasteners, wherein said fasteners are received within said slots of said aperture member retainer and are threadingly engaged with said housing for securing said aperture member retainer to said housing.

8. The stud welding gun as set forth in claim 7, wherein said cartridges include an opening within said first side wall extending generally perpendicular to the longitudinal axis of said plurality of stud fasteners for allowing said plurality of stud fasteners to be urged toward said stud attachment gun.

9. A method of welding studs of different lengths to base members using a stud welding gun, said stud welding gun having a chuck, a first passage generally coaxially aligned with said chuck, and an aperture member including a slot extending generally transverse to said first passage and communicating with said first passage, said method comprising the following steps:

mounting a first aperture member with a slot of a first length to said housing of said stud welding gun;

positioning a first cartridge holding a plurality of studs each having a first length approximately equal to the length of said slot in said first aperture member and arrayed in side to side relation opposite said first aperture member of said stud welding gun and delivering a stud of said first length through said slot in said first aperture member to said first passage of said stud welding gun;

delivering a stud of said first length through said first passage of said stud welding gun to said chuck and welding said stud of said first length to a base member;

removing said first aperture member from said stud welding gun and mounting a second aperture member with a slot of a second length to said housing of said stud welding gun;

removing said first cartridge from said stud welding gun and positioning a second cartridge holding a plurality of studs each having a second length different than said studs of said first length and approximately equal to the length of said slot in said second aperture member and arrayed in side to side relation opposite said second aperture member of said stud welding gun and delivering a stud of said second length through said slot in said second aperture member to said first passage of said stud welding gun; and delivering a stud of said second length through said first passage of said stud welding gun to said chuck and welding said stud of said second length to a base member.

10. The method of welding studs of different lengths to base members as defined in claim 9, wherein said first and second cartridges each include opposed first and second side walls spaced to receive a plurality of studs in side by side array and opposed end walls extending between said first and second side walls, said first cartridge having end walls spaced a distance approximately equal to said first length to receive studs having said first length and said second cartridge having end walls spaced approximately equal to said second length to receive studs having said second length, at least one of said side walls of each of said cartridges extending beyond said end walls to a pre-determined overall length, each of said cartridges having said pre-determined overall length, said method including loading said first and second cartridges with a plurality of studs in side to side array, wherein the distance between said end walls of said first cartridge is approximately equal to said first length and the distance between said end walls of said second cartridge is approximately equal to said second length.

11. The method of welding studs of different lengths to base members as defined in claim 10 wherein said stud welding gun includes an aperture member retainer slidably mounted to said housing for removably securing said aperture member therebetween, said method including the steps of sliding said aperture member retainer away from said first aperture member to allow said first aperture member to be removed and sliding said aperture member retainer against said second aperture member once said second aperture member has been positioned onto the housing.

12. The method of welding studs of different lengths to base members as defined in claim 11 wherein said aperture member retainer includes a pair of slots extending through said aperture member retainer and a threaded fastener extends through each slot to secure said aperture member retainer to said housing, said method including the steps of loosening said threaded fasteners prior to sliding said aperture member retainer away from said first aperture member and tightening said threaded fasteners after said aperture member retainer has been positioned against said second aperture member.

13. A cartridge for delivering a plurality of self-attaching stud fasteners of a first length to a stud attachment gun having a generally rectangular shape and including opposed first and second side walls spaced to receive a plurality of studs in side by side array and opposed end walls extending between said first and second side walls, at least one of said side walls of said cartridge extending beyond said end walls to a pre-determined overall length, said cartridge having said pre-determined overall length.

14. The cartridge as set forth in claim 13, wherein said first and second side walls each extend beyond said end walls to said pre-determined overall length.

15. The cartridge as set forth in claim 14, wherein said cartridge includes outer walls extending between opposed distal ends of said side walls.

16. The cartridge as set forth in claim 15, wherein said end walls of said cartridge are said outer walls of said cartridge.

17. The cartridge as set forth in claim 16 wherein said first side wall includes an opening extending generally perpendicular to the longitudinal axis of said plurality of stud fasteners for allowing said plurality of stud fasteners to be urged toward said stud attachment gun.

18. The cartridge as set forth in claim 13 wherein said cartridge is formed from a polymer.

19. A cartridge for delivering a plurality of self-attaching stud fasteners of a first length to a stud attachment gun having a generally rectangular shape and including opposed first and second side walls spaced to receive said plurality of stud fasteners in side by side array and opposed end walls spaced a distance approximately equal to said first length to receive said stud fasteners of said first length, said first side wall including an opening extending generally perpendicular to the longitudinal axis of said plurality of stud fasteners for allowing said plurality of stud fasteners to be urged toward said stud attachment gun, said cartridge including outer walls extending between opposed distal ends of said first and second side walls and spaced a pre-determined distance, said cartridge having a length defined by said pre-determined distance.

20. A plurality of at least two stud cartridges for delivering a plurality of self-attaching stud fasteners of different lengths to a stud attachment gun, each cartridge having opposed first and second side walls to receive a plurality of studs in side by side array and opposed end walls extending between said first and second side walls, including a first cartridge having end walls spaced a distance approximately equal to said first length to receive studs having said first length and a second cartridge having end walls spaced a distance approximately equal to said second length to receive studs having said second length, at least one of said side walls of each of said cartridges extending beyond said end walls to a pre-determined overall length, each of said cartridges having said pre-determined overall length, said first side wall of each cartridge including an opening extending generally perpendicular to the longitudinal axis of said plurality of stud fasteners for allowing said plurality of stud fasteners to be urged toward said stud attachment gun.

21. A stud welding gun for use in welding studs of a first length and a second length to base members, said stud welding gun comprising:
 a handle assembly;
 a frame which is connected with and extends outward from said handle assembly;
 a stud holder disposed at an outer end portion of said frame, said stud holder being effective to hold a stud while an electrical current flows between the stud held by said stud holder and the base member during welding of the stud held by said stud welding gun to the base member;
 a stud feed member connected with said frame and is movable from a retracted position to an extended position to move a stud toward said stud holder;
 a housing connected with said frame;
 at least two stud cartridges having a plurality of studs, each cartridge having opposed first and second side walls spaced sufficiently to receive a plurality of studs in side by side array and opposed end walls, including a first cartridge having end walls spaced to receive studs having a first length and a second cartridge having end walls spaced to receive studs having a second length, and said housing adapted to receive either of said first and second cartridges with a longitudinal central axis of each stud of the plurality of studs extending along the path of movement of said stud feed member between the extended and retracted positions;
 each of said cartridges having substantially the same length measured between opposed ends of said side walls and said housing having a passage receiving one of said cartridges including opposed end walls spaced a distance equal to proximately said length of said cartridges, thereby permitting loading of either of said first and second cartridges into said housing; and
 a stud mover which sequentially moves studs in the plurality of studs into the path of movement of said stud feed member between the extended and retracted positions.

22. The stud welding gun as described in claim 21, wherein said stud welding gun includes a first passage generally coaxially aligned with said stud holder, and a second passage extending generally transverse to said first passage and communicating with said first passage for transmitting studs from said cartridge to said stud holder, wherein said second passage comprises one of at least two aperture members mounted to said housing, including a first aperture member having a generally rectangular shape and a slot formed therein, said slot having a length approximately equal to said first length, a second aperture member having a generally rectangular shape with dimensions substantially the same as said first aperture member and a slot formed therein, said slot in said second aperture member having a length approximately equal to said second length.

23. The stud welding gun as described in claim 22, including a slidable aperture member retainer for securing said aperture member to said housing wherein said aperture member retainer is generally rectangular in shape and includes a pair of slots extending perpendicular to said slot in said aperture member for slidably securing said aperture member retainer to said housing.

24. The stud welding gun as described in claim 23, including a pair of threaded fasteners, wherein said fasteners are received within said slots of said aperture member retainer and are threadingly engaged with said housing for securing said aperture member retainer to said housing.

* * * * *